United States Patent Office 3,600,322
Patented Aug. 17, 1971

3,600,322
PAINT REMOVAL FORMULATION
Charles R. W. Morison, Clearwater, Fla., assignor to Union Carbide Corporation
No Drawing. Filed May 29, 1968, Ser. No. 732,843
Int. Cl. C09d 9/00; C11d 7/50; C23g 5/02
U.S. Cl. 252—171
3 Claims

ABSTRACT OF THE DISCLOSURE

A paint remover composition comprising a methylene chloride-methanol solvent and a quaternary nitrogen containing cellulose ether.

---

This invention relates to compositions or formulation used for the removal of paints, coatings and finishes.

At the present time, in addition to the well known shellacs, varnishes, natural resins and gums, there exists a variety of other surface coating formulations such as lacquers formed from nitro-cellulose, cellulose esters; synthetics such as vinyl-type resins and acrylics; linseed oil paints; alkyd resins; and others.

In spite of continued improvement throughout the years in the quality of surface coatings, the coatings do deteriorate with time. The effect of nature's elements such as wind, sun and rain takes its toll, and frequently this toll is hastened by a side effect induced by man-made products injurious to the artistic appeal of the coatings. Those coatings which are not exposed to wind, sun and rain become unsightly with time and, hence, also lose aesthetic appeal. While frequently it is possible and desirable, to lay down a fresh coat over the old, in many cases the old coat must be removed before a suitable resurfacing layer can be satisfactorily applied. In view of the wide variety of surface coating formulations now available, the art has attempted to provide an equally large number of surface coating removing formulations. Basically, the ingredients contained in a formulation useful for the removal of the above surface coating materials usually comprise (a) an active organic solvent, including binary, tertiary, etc., and mixtures thereof, (b) a viscosity thickener, and (c) an evaporation retardant or film-forming compound. Commercial removal formulations also may include one or more of the following ingredients such as activator, emulsifying agent, water, wetting agent and the like. The function of the active organic solvent is to loosen the surface coating or film so that it can be easily removed from the surface, whereas the viscosity thickener is added to provided sufficient viscosity to the removal formulation to meet the particular requirements at hand. For example, the removal of a coating from a vertical surface would dictate a removal formulation which possesses sufficient viscosity such that the formulation will not drain or "run" before the solvent has had a chance to penetrate the surface coating layer. Also, the viscosity of the removal formulation oftentimes will be varied according to the technique or equipment which will be employed to remove the surface coating, for example, brushing, rolling, spraying, and the like. The function of the evaporation retardant is indicated by its name. When a coating removal formulation is applied to the surface to be treated, evaporation of a minor portion of the active organic solvent generally will occur resulting in the formation of a thin waxy coating over the remover composition. The evaporation retardants or "film forming compounds" as they are otherwise known, are added to the composition to repress evaporation of the solvent until it has had an opportunity to act.

Of the several types of surface coating removers on the market today, the most widely used are those based upon methylene chloride as the solvent. This solvent has the most pronounced effect upon the widest range of surface coatings in use at the present time. Unfortunately, however, methylene chloride is relatively expensive when compared to less effective removers in general. Methanol, for example, is much less expensive. However, methanol is greatly inferior in its ability to remove surface coatings than methylene chloride. Advantageously however, methanol can serve as a cheapening diluent for methylene chloride without impairing noticeably the ability of methylene chloride to remove the surface coating. There is, however, a limit as to the amount of methanol which can be employed and this limit is determined in part by the effect the methanol has on various thickening agents. For example, when employing the popular methyl cellulose as a thickener for the removal composition, the methanol must be used in relatively small quantities, for otherwise the methyl cellulose would be precipitated from solution, and the whole paint remover then becomes unsuitable.

The present invention contemplates the preparation of a novel formulation useful for the removal of coatings and finishes such as paints, varnishes, lacquers, shellacs, gums, natural and synthetic resins, and the like which includes a methylene chloride-methanol organic solvent mixture, the latter being present in significant proportion such as to make the use of the solvent economically attractive while still attaining the results at least equivalent to the use of methylene chloride individually, and a quaternary nitrogen containing cellulose ether thickener as hereinafter defined. In addition, the novel formulation can include one or more to vary the characteristics of coating remover formulations such as, for example, wetting agent, e.g., sodium sulfate derivatives of 3,9-diethyltridecane-6-ol; emulsifying agent, for example, alkyl phenyl polyethylene glycol ether; activator, for example, triethanolamine; water; penetrant, for example, creosote; filler, for example, ground wood, powdered calcium carbonate; and the like.

The quaternary nitrogen containing cellulose ethers contemplated as the viscosity thickening component in the novel surface coating removal formulations of this invention are polymers having a backbone of anhydroglucose units with pendant substituent groups bearing a full positive charge spaced along the backbone. The cellulose ethers are polymers of the structural formula

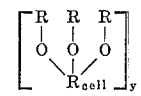

wherein $R_{cell}$ is the residue of an anhydroglucose unit, $y$ is an integer having a value of from about 50 to about 20,000, and each R individually represents a substituent group of the general formula

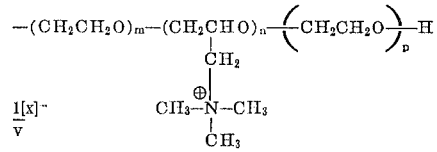

wherein $m$ is an integer having a value of from zero to 10; $n$ is an integer having a value of from zero to 3; $p$ is an integer having a value of from zero to 10; $x$ is an anion; $v$ is an integer which is equal to the valence of $x$; the average value of $n$ per anhydroglucose unit of said cellulose ether is from about .02 to about 1; and the average value of $m+p$ per anhydroglucose unit of said cellulose ether is from about 0.5 to about 4.

The preparation of these quaternary nitrogen containing cellulose ethers are fully described in the application of F. W. Stone and J. M. Rutherford Jr., Ser. No. 487,312 filed Sept. 14, 1965 and is incorporated herein by reference.

Generally however, the cellulosic ethers of the present invention can be prepared by reacting a suitable trimethyl ammonium chlorohydrin such as represented by the structural formula:

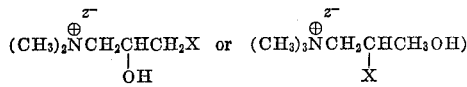

wherein X is halogen and $z^-$ equals any anion, or the corresponding glycidyl trimethyl ammonium salts, with hydroxyl ethyl cellulose.

Alternately, however, the above quaternary compounds can first be reacted with cellulose and these products further reacted with ethylene oxide. In still another technique, the cellulose can be reacted with the ethylene oxide and the quaternary compounds simultaneously to produce the desired products.

Preferably, the reaction is conducted in an alkaline medium as is conventional in the art for producing cellulose ethers.

Temperature can be varied over a wide range such as from 5° to 100° C. or higher. These ethers have poor solubility in most organic liquids and mixtures of liquids. Methylene chloride is not a solvent or swelling agent for these ethers. However, the ethers described above can be made to dissolve in mixtures of methylene chloride and methanol, thus satisfying the requirement that the thickening agent be soluble in the organic solvent.

An important feature of the present invention is that the surface coating remover provides excellent results without the aid of evaporation retardants or film-forming compounds. Thus, there is no need to include in the formulation evaporation retardants, such as paraffin wax, montan or ceresin wax, crude scale wax, bees' wax, and other like film-forming compounds.

For optimum results, the concentration of the components comprising the surface coating removal formulation will be governed by several considerations such as the composition of the surface coating to be removed, the position of the surface coating, that is, whether on an incline or horizontal surface, and other factors. As a general rule, the concentration of the quaternary nitrogen containing cellulose ethers in the formulation should be sufficient to impart increased viscosity to the formulation and in this respect factors such as, for example, the means contemplated in applying the formulation to the surface coating and ratio of methylene chloride to methanol employed, will play a role in determining the ultimate concentration of this ingredient. The optimum ratio for the methylene chloride-methanol solvent comprising the surface coating removal formulation is generally within the range of about 4 to 1.5. Broadly, the surface coating removal formulation can comprise from about 99.5 to 90 parts by weight of methylene chloride-methanol solvent, and from about .5 to 10 parts by weight of quaternary nitrogen containing cellulose ether. It is preferred that the removal formulation comprise from about 99 to 96 parts by weight of methanol-methylene chloride solvent, and from about 1 to 4 parts by weight of quaternary nitrogen containing cellulose ether.

Although an evaporation retardant is not essential as an ingredient of the formulation of the present invention it may, however, be included without producing detrimental effects and indeed in some cases an evaporation retardant may be useful. Any of the previously discussed evaporation retardants may be included.

The particular manner of mixing the components to prepare the novel formulations is not narrowly critical. For example, where an evaporation retardant is employed, both the evaporation retardant and the quaternary nitrogen containing cellulose ether can be added to the methanol-methylene chloride solvent at room temperature or at elevated temperatures, and agitated until solution occurs.

The following examples illustrate the invention.

EXAMPLE 1

A quaternary nitrogen containing cellulose ether wherein the average value per anhydroglucose unit of $n=0.50$ and the average value per anhydroglucose unit of $m+p=1.64$ in the generic formula heretofore indicated was prepared by reaction of an agitated slurry of 22.6 parts cellulose (cotton linters) in an isopropanol-water medium containing 15.70 parts, 50% aqueous sodium hydroxide with 43.52 parts, 70% aqueous 3-chloro-2-hydroxypropyltrimethyl ammonium chloride and thereafter further reacting the slurry with 21.3 parts ethylene oxide in the presence of an additional 18.70 parts of 50% aqueous sodium hydroxide. The reaction product was neutralized with acetic acid, recovered and dried.

Three separate mixtures of methylene chloride and methanol were prepared. These mixtures were prepared by admixing methylene chloride and methanol in volume ratios of 40:10, 35:20 and 30:20, respectively. To each of the admixtures there was added the above quaternary nitrogen containing cellulose ether, so that the solubility in each admixture could be determined. The ether was added in an amount of 2 percent by weight/volume. Analysis indicated that a heavy mush resulted in all three admixtures. The mushes formed have a paint removing layer which remained in place on a vertical surface in a layer about ¼ inch in thickness.

EXAMPLE 2

A quaternary cellulose ether was prepared according to the procedure described in Example 1 wherein the average values per anhydroglucose unit of $n$ and $m+p$ of the generic formula was as follows: $n=0.19$; $m+p=1.48$.

One gram of the above cellulose ether was suspended in a homogeneous mixture comprised of methylene chloride (35 cc.) and methanol (15 cc.). The resin began to swell immediately, but slowly. After a three hour period at 25° C. swelling and dissolution had taken place to such an extent that the mass was mushy. The mush was spread readily with a spatula on a three-month old alkyd resin surface coating. The paint began to "lift" in a matter of seconds, and loosened completely in a few minutes. The loose paint was scraped off readily. The exposed metal surface was brushed well, wiped dry with a clean cloth and the surface was then deemed ready for recoating. After 20 hours at ambient temperatures the unused "mush" had turned to a medium-heavy gel which could be knifed onto any adaptable surface. When this system was knifed onto a three month old alkyd resin surface, the surface began to lift in 10–12 seconds and was ready for scraping in five minutes.

EXAMPLE 3

A quaternary cellulose ether was prepared according to the procedure described in Example 1 wherein the average values per anhydroglucose unit of $n$ and $m+p$ was as follows:

$$n=0.33$$
$$M+p=1.76$$

One gram of the above cellulose ether was suspended in a homogeneous mixture comprised of methylene chloride (35 cc.) and methanol (15 cc.). The resin began to swell immediately, but slowly. After a three hour period at 25° C. swelling and dissolution had taken place to such an extent that the mass was mushy. The mush was spread readily with a spatula on a three-month old alkyd resin surface coating. The paint began to "lift" in a matter of seconds, and loosened completely in a few minutes. The loose paint was scraped off readily. The exposed metal surface was brushed well, wiped dry with a clean cloth and the surface was then deemed ready for re-coating. After 20 hours at ambient temperatures the unused "mush" had turned to a medium-heavy gel which could be knifed onto any adaptable surface. When this system was knifed onto a three month old alkyd resin surface, the surface began to lift in 10–12 seconds and was ready for scraping in five minutes.

EXAMPLE 4

One gram of the cellulose ether of Example 3 was suspended in a solution comprising 30 cc. of methylene chloride and 20 cc. of methanol. After a three hour period of waiting, the whole had become a mush capable of being employed as a paint or other surface coating remover. After a 20 hour period at ambient temperatures, the mush spontaneously had changed to a thin gel. When brushed upon a surface which had been coated many months before with a polyvinyl acetate latex paint, the paint began to crinkle and lift within five seconds. It dissolved in one minute and could be scraped off readily.

EXAMPLE 5

A cellulosic ether was prepared according to the procedure of Example 1 except that the ether was prepared by the reaction of preformed hydroxyethyl cellulose with a quaternary chlorohydrin in the presence of sodium hydroxide. The average values per anhydroglucose unit of $n$, and $m+p$ are indicated below:

Value of $n$ ------------------------------------- 0.35
Value of $m+p$ ----------------------------------- 1.70

One gram of the ether was introduced into each of the solutions shown in Table I.

TABLE I

| Solution Number | 1 | 2 | 3 | 4 | 5 | 6 | 7 | 8 | 9 |
|---|---|---|---|---|---|---|---|---|---|
| Methylene chloride, cc | 49 | 47 | 45 | 43 | 40 | 35 | 32 | 30 | 27 |
| Methanol, cc | 1 | 3 | 5 | 7 | 10 | 15 | 18 | 20 | 23 |
| Solubility [1] | Increasing swelling | | | | | | Maximum | | |

[1] Solution No. 7 indicated substantial solubility of the ether. A portion which was allowed to evaporate to dryness formed a relatively strong continuous film which contained particles of insoluble, but previously highly swollen, fibers imbedded therein.

By the term "increasing swelling" is meant the following: In Solution No. 1 there was a very small degree of swelling as judged by the depth of the small amount of cellulose ether resting as a residue on the bottom of the vessel containing the solvent as compared to the depth of a similar amount of ether in pure methylene chloride. No swelling is observed to occur in that liquid. In Solution No. 7, the maximum swelling occurred, supernatant liquor was nonexistent and the system formed a very thin mush. A substantial amount of the ether appeared to have dissolved.

EXAMPLES 6 AND 7

Two additional cellulose ethers were prepared according to the procedure of Example 5. The average values per anhydroglucose unit of $n$, and $m+p$ were obtained by varying the quantity of quaternary chlorohydrin. The celluose ethers were labeled sample A and sample B and the values of $n$, and $m+p$ are indicated below

| | Value of $n$ | Value of $m+p$ |
|---|---|---|
| Sample: | | |
| A | 0.05 | 1.80 |
| B | 0.02 | 1.80 |

These cellulose ethers were evaluated as described in Example 5 and compared with ordinary hydroxyethyl celluose i.e., one not containing a quaternary nitrogen cellulose ether and the following results were obtained.

| Solution No. | | | | | | | | | |
|---|---|---|---|---|---|---|---|---|---|
| 1 | 2 | 3 | 4 | 5 | 6 | 7 | 8 | 9 |
| A | ←—— Slight Swelling ——→ | | | | | | | |
| B | ←—— Some Swelling ←—— Very Mushy [1] ——→ | | | | | | | |
| Hydroxyethyl Cellulose | ←—— No Swelling ——→ | | | | | | | |

[1] By "mushy" is meant the consistency of wet snow.

When solutions Nos. 7 and 8 of A and B above, were sealed to prevent slow evaporation and allowed to remain at ambient temperatures for a period of one day, both became gels. When the gels were placed upon a surface which had been covered by an alkyd resin many months before, the coating lifted in a matter of minutes. The same occurred to a surface coated with a polyvinyl acetate latex paint.

In the preceding examples the nature of the thickened systems is such that viscosity measurements are useless. The term "mush" is used to define the nature of the thickened system and reliance is made on the judgment of those skilled in the art to sense the enormous increases in viscosity.

As mentioned previously, a decided advantage of the novel systems described is that an evaporation retardant such as wax, need not be added to prevent too rapid evaporation of solvent. While slow evaporation of solvent does occur, it is slow enough to enable the solvent to complete its function in time. The quaternary cellulose ethers apparently act as their own retarders. This of course makes the use of a soap quite unnecessary and, hence, reduces or eliminates the need for rinsing the cleaned surface with a solvent for wax after the coating has been removed. Each of these advantages means a reduction in over-all cost, which is forever attractive to industry. However, a wax can be added to the formulation if desired. Also, penetrants such as amines can be added in conventional manner if desired. In addition acids can be added to hasten further "cutting" of the surface coating where any particular coating proves exceptionally resistant to attack by methylene chloride.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A paint remover composition consisting essentially of methylene chloride, methanol, and a quaternary nitrogen cellulose ether of the formula:

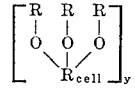

wherein $R_{cell}$ is the residue of an anhydroglucose unit, $y$ is an integer having a value of from about 50 to about 20,000 and each R individually represents a substituent group of the general formula:

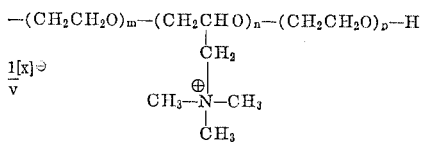

wherein $m$ is an integer having a value of from zero to 10; $n$ is an integer having a value of from zero to 3; $p$ is an integer having a value of from zero to 10; $x$ is an anion; $v$ is an integer which is equal to the valence of $x$; the average value of $n$ per anhydroglucose unit of said cellulose ether is from about .02 to about 1; and the average of $m+p$ per anhydroglucose unit of said cellulose ether is from about 0.5 to about 4 wherein the volume ratio of methylene chloride to methanol is within the range of about 4 to about 1.5 and wherein the methylene chloride-methanol solvent is present in the amount of from 99 to 96 parts by weight and the ether is present in an amount of 1 to 4 parts by weight.

2. A paint remover composition according to claim 1 wherein the quaternary nitrogen containing cellulose ether is present in said composition in an amount of 1 to 10% by weight.

3. A paint remover composition according to claim 1 wherein the average value of $n$ per anhydroglucose unit is from about 0.02 to about 0.50 and the average value of $m+p$ per anhydroglucose unit is from about 1.4 to about 2.5.

References Cited
UNITED STATES PATENTS

| | | | |
|---|---|---|---|
| 2,507,983 | 5/1950 | Kuentzel | 252—144 |
| 3,075,923 | 7/1963 | Berst et al. | 252—171 |
| 3,094,491 | 6/1963 | Greminger, Jr., et al. | 252—171 |
| 3,472,840 | 10/1969 | Stone et al. | 260—231 |

LEON D. ROSDOL, Primary Examiner

W. E. SCHULZ, Assistant Examiner

U.S. Cl. X.R.

34—38

UNITED STATES PATENT OFFICE
CERTIFICATE OF CORRECTION

Patent No. 3,600,322    Dated August 17, 1971

Inventor(s) C. R. W. Morison

It is certified that error appears in the above-identified patent and that said Letters Patent are hereby corrected as shown below:

Column 2, line 31, after "more" insert "conventional ingredients which are oftentimes employed".

Signed and sealed this 11th day of January 1972.

(SEAL)
Attest:

EDWARD M. FLETCHER, JR.
Attesting Officer

ROBERT GOTTSCHALK
Acting Commissioner of Patents